UNITED STATES PATENT OFFICE.

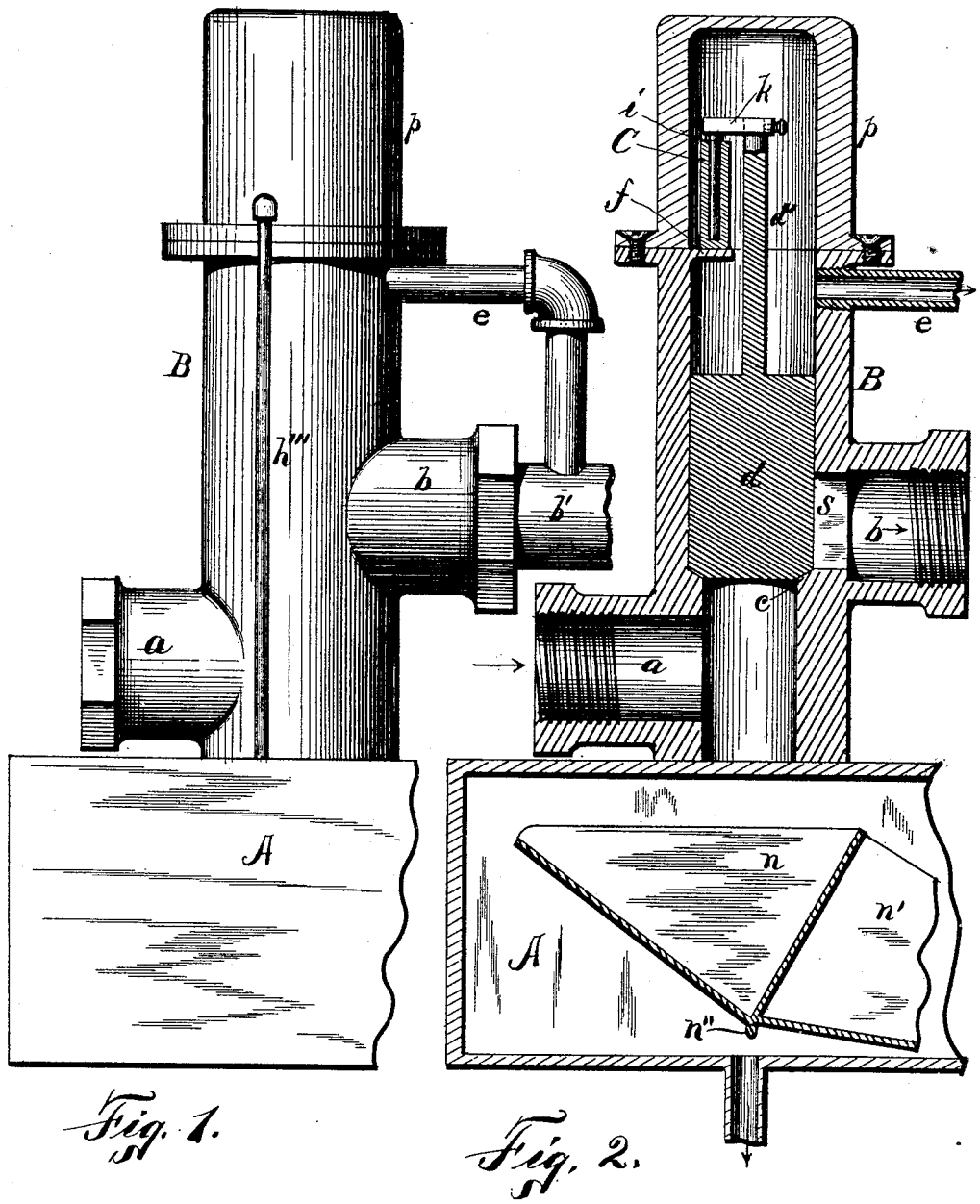

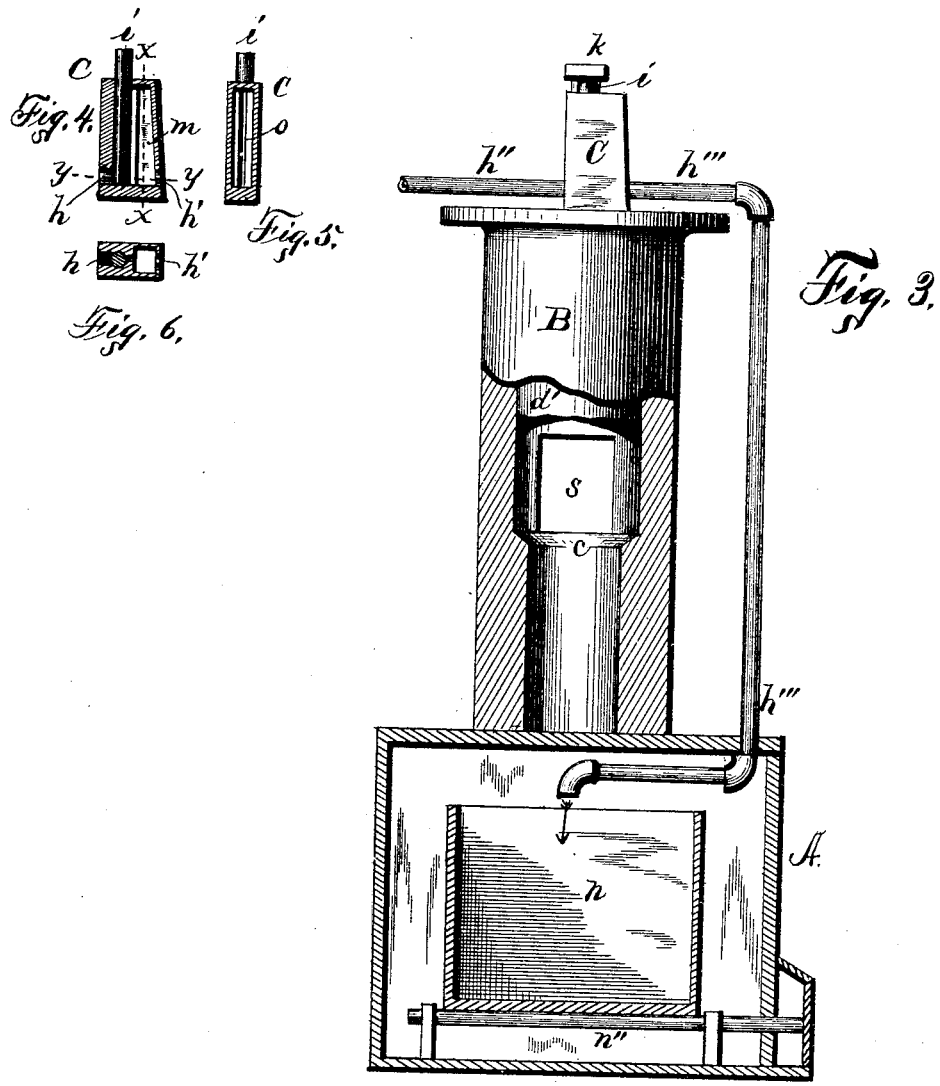

WILLIAM D. HAWLEY AND SILAS J. HOGAN, OF SYRACUSE, NEW YORK.

PROPORTIONAL METER.

SPECIFICATION forming part of Letters Patent No. 479,759, dated July 26, 1892.

Application filed August 31, 1891. Serial No. 404,259. (No model.)

*To all whom it may concern:*

Be it known that we, WILLIAM D. HAWLEY and SILAS J. HOGAN, of Syracuse, in the county of Onondaga, in the State of New York, have invented new and useful Improvements in Meters, of which the following, taken in connection with the accompanying drawings, is a full, clear, and exact description.

Our invention relates to meters, and particularly to that class commonly known as "proportional" or in which the liquid or fluid being measured bears a certain fixed or predetermined ratio to the measuring medium.

Our object is to produce a meter of that class or style adapted to be used for measuring the amount of steam, water, or other fluid or liquid passing through it or used by a consumer, based upon the ratio which a given quantity of a measuring medium bears to a given amount of the fluid or liquid being measured, such ratio being predetermined and fixed, means being also provided for measuring the quantity of the medium used and recording it automatically, said meter comprising a casing, inlet and discharge pipes therefrom, a piston operated by the passing liquid, an inlet and discharge pipe for the measuring medium, its passage through being regulated by a valve directly connected to said piston and actuated to open or close thereby, and means for catching, measuring, and discharging the amount of measuring medium which passes through said valve, the shaft of said measure being connected to and actuating a recording mechanism which records the number of discharges of the measured medium.

Our invention consists in the several novel features of construction and operation hereinafter described, and which are specifically set forth in the claims hereunto annexed.

Although our device can be applied and used for measuring many kinds of fluids and liquids, we shall limit the description of the use thereof to the measuring of steam, as all of the other uses are alike or closely analogous to it. It is constructed as follows, reference being had to the accompanying drawings, in which—

Figure 1 is a front elevation of the meter complete. Fig. 2 is a vertical longitudinal section of the same. Fig. 3 is a vertical sectional elevation on a line at a right angle to the line of Fig. 2, the cover being removed. Fig. 4 is a vertical longitudinal sectional elevation of the measuring-valve chamber. Fig. 5 is a transverse vertical section on line $x\, x$ in Fig. 4. Fig. 6 is a transverse horizontal section on line $y\, y$, Fig. 4.

A is the base—a box-like structure—and B is the casing or meter-body, of cylindrical form and having an inlet-pipe nipple $a$ and an eduction-pipe nipple $b$ upon opposite sides, which admit and discharge the steam, and further provided with a seat $c$ for the valve $d$. This valve is provided with a stem $d'$. A pipe $e$ has one end inserted through the body above said valve and the other end is secured in the eduction steam-pipe $b'$. Upon a removable shelf $f$ (though not shown) we mount the valve-chamber C, provided with posts $h\, h'$ near its bottom, which are respectively the induction and eduction ports and receive the pipes $h''$ and $h'''$, further provided with a vertical seat for the cylindrical piston-valve $i$, the upper end of which is adjustably connected to the arm $k$, which is detachably and adjustably secured to the top of the stem $d'$, further provided with a slot $o$, extending vertically the whole length of the valve-seat and connecting it to the chamber $m$, from which the eduction-pipe leads, extending down to and into the base at a point over the oscillating measuring-buckets $n\, n'$. These buckets are secured to a shaft $n''$, journaled in the base, one end of which projects through it and is there connected to the recording mechanism. (Not shown.) The cap $p$ closes the top of the meter-body.

In Fig. 3 it will be seen that we make the aperture $s$ between the nipple $b$ and the steam-chamber in the meter-body of rectangular form, and we do this because it better accomplishes our object, and when the valve is operated by the steam it opens a steam-port of even width clear across. When the steam is let on, it raises the steam-valve and to a like degree raises and opens the piston or water valve. The steam flows into the eduction-pipe and at the same time flows back through the pipe $e$ into the meter-body above the steam-valve; but the downward pressure upon the steam-valve is somewhat less than the direct upward pressure thereon, and it quickly closes when the steam is shut off, the steam-pressure upon the top of the valve aiding its gravity. Simultaneously with the opening of the steam-valve the water-valve is opened the same distance vertically, and as the eduction-slot $l$ is made of a fixed proportionate size to that of the aperture $s$ so the amount of water passing through this slot bears a fixed proportion to the amount of steam passing through under the steam-valve, and this proportion does not vary, even though the steam-pressure may. The water-eduction pipe conducts the water to and discharges it into one of the buckets $n$ or $n'$. Each of these holds the same quantity of water, (predetermined,) and consequently each bucket full of water represents a fixed quantity of steam—in cubic feet, for instance, or according to any other scale adopted. When one bucket is full, it being so balanced, it tilts or oscillates, bringing the other bucket under the discharge-pipe $e$, and this bucket is then filled while the other is being emptied. As the buckets are secured upon the shaft, their tilting oscillates it and its outer end may be connected to and its oscillation will actuate a mechanism (not shown) which will record the number of the buckets filled and emptied, and then by a simple arithmetical calculation the amount or quantity of steam which has been used by the consumer is readily ascertained.

It will be seen that the proportion of the size of the slot in the water-valve to that of the steam-aperture will always remain the same, no matter how much the steam-valve is opened. As both valves operate evenly synchronously, the vertical movement of one is always equal to that of the other.

What we claim as our invention, and desire to secure by Letters Patent, is—

1. In a meter, the combination, with the meter-body provided with induction and eduction ports and the main valve seated therein and normally closing the eduction-port and provided with a vertical stem and an arm upon its upper end, of a separate valve-chamber supported within the meter-body above the main valve and provided with induction and eduction ports and piping connected therewith and a valve in said chamber connected to the arm upon the main-valve stem.

2. In a meter, the combination, with the meter-body provided with induction and eduction ports and the main valve seated therein and normally closing the eduction-port and provided with a vertical stem and an arm upon its upper end, of a separate valve-chamber supported within the meter-body above the main valve and provided with induction and eduction ports and piping connected therewith and a valve in said chamber connected to the arm upon the main-valve stem and means for measuring the discharge from the latter valve-chamber.

3. In a meter, the combination, with the meter-body provided with eduction and induction ports and the valves therein, of a pipe connecting the eduction-pipe with the chamber in the body above the main valve.

4. In a meter, the combination, with the main valve operated to open and close a rectangular eduction-port, of an auxiliary valve connected to and simultaneously operated by the main valve to open and close another eduction-port from the auxiliary-valve chamber, an inlet-pipe thereto, and an eduction pipe therefrom, and tilting buckets receiving the discharge from the latter eduction-pipe, as and for the purposes set forth.

In witness whereof we have hereunto set our hands this 27th day of August, 1891.

WM. D. HAWLEY.
    SILAS J. HOGAN.

In presence of—
 HOWARD P. DENISON,
 H. A. CARHART.